(12) United States Patent
Seo et al.

(10) Patent No.: US 8,325,312 B2
(45) Date of Patent: Dec. 4, 2012

(54) LIQUID CRYSTAL DISPLAY AND METHOD FOR MANUFACTURING THE SAME

(75) Inventors: Hyeon Jin Seo, Gyeongsangbuk-do (KR); Jeong Hoon Lee, Gyeongsangbuk-do (KR); Dhang Kwon, Daejeon-si (KR); Hang Sup Cho, Gyeongsangbuk-do (KR); Ho Su Kim, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 130 days.

(21) Appl. No.: 12/230,226

(22) Filed: Aug. 26, 2008

(65) Prior Publication Data

US 2009/0086151 A1 Apr. 2, 2009

(30) Foreign Application Priority Data

Sep. 28, 2007 (KR) .................. 10-2007-0097932

(51) Int. Cl.
*G02F 1/1339* (2006.01)
(52) U.S. Cl. ........................................ 349/155
(58) Field of Classification Search ............. 349/155
See application file for complete search history.

(56) References Cited

U.S. PATENT DOCUMENTS

| | | | | |
|---|---|---|---|---|
| 5,328,728 A * | 7/1994 | Swirbel et al. | ........ | 427/600 |
| 5,812,232 A * | 9/1998 | Shiroto et al. | ........ | 349/157 |
| 6,137,559 A * | 10/2000 | Tanaka et al. | ........ | 349/153 |
| 6,392,735 B1 * | 5/2002 | Tani | ........ | 349/156 |
| 6,486,936 B1 | 11/2002 | Sugimoto | | |
| 6,882,392 B2 * | 4/2005 | Nam et al. | ........ | 349/124 |
| 6,888,608 B2 * | 5/2005 | Miyazaki et al. | ........ | 349/156 |
| 7,796,233 B2 * | 9/2010 | Park et al. | ........ | 349/155 |
| 2001/0033347 A1 * | 10/2001 | Kitahora et al. | ........ | 349/58 |
| 2001/0038427 A1 * | 11/2001 | Ueda et al. | ........ | 349/74 |
| 2002/0063831 A1 * | 5/2002 | Nam et al. | ........ | 349/124 |
| 2006/0181667 A1 * | 8/2006 | Doi et al. | ........ | 349/155 |
| 2007/0058126 A1 * | 3/2007 | Cho et al. | ........ | 349/156 |
| 2007/0097312 A1 * | 5/2007 | Park et al. | ........ | 349/155 |
| 2009/0059146 A1 * | 3/2009 | Morii | ........ | 349/123 |

FOREIGN PATENT DOCUMENTS

| | | |
|---|---|---|
| CN | 1573489 | 2/2005 |
| CN | 1788058 A | 6/2006 |
| CN | 1883114 A | 12/2006 |
| CN | 1982989 A | 6/2007 |
| JP | 61-235817 | 10/1986 |

* cited by examiner

*Primary Examiner* — K. Cyrus Kianni
(74) *Attorney, Agent, or Firm* — Morgan, Lewis & Bockius LLP

(57) ABSTRACT

A liquid crystal display (LCD) device maintains a cell gap and prevents press defects via the use of ball spacers. The liquid crystal display device includes first and second substrates facing each other, a plurality of first spacers, a plurality of second spacers, and a liquid crystal layer filled between the first and second substrates. The first spacers are formed between the first and second substrates at portions of a black matrix layer of the second substrate. The first spacers include a plurality of first balls with a first diameter and a first solid to aggregate the first balls. The second spacers are formed at portions of the black matrix layer between the first and second substrates. The second spacers include a plurality of second balls with a second diameter 0.2 to 0.6 μm smaller than the first diameter and a second solid to aggregate the second balls.

10 Claims, 6 Drawing Sheets

LIQUID CRYSTAL DISPLAY AND METHOD FOR MANUFACTURING THE SAME

This application claims the benefit of Korean Patent Application No. P2007-097932, filed on Sep. 28, 2007, which is hereby incorporated by reference as if fully set forth herein.

BACKGROUND OF THE INVENTION

1. Field of the Invention

The present invention relates to a liquid crystal display (LCD) device. More particularly, the present invention relates to a liquid crystal display (LCD) device and a method for manufacturing the same, capable of maintaining a cell gap and preventing press defects caused by application of a predetermined external pressure via the use of ball spacers.

2. Discussion of the Related Art

Hereinafter, a conventional liquid crystal display device will be illustrated with reference to the attached drawings.

FIG. 1 is a cross-sectional view illustrating a conventional liquid crystal display device.

As shown in FIG. 1, the conventional LCD device comprises a first substrate 10 and a second substrate 20 facing each other, gate lines 11 and data lines (now shown) arranged on the first substrate 10 such that they intersect each other, to define pixel regions, pixel electrodes formed in each of the pixel regions, and a liquid crystal layer (not shown) sealed between the first substrate 10 and the second substrate 20.

Here, a gate insulating film 14 is arranged over the entire surface of the first substrate 10 including the gate lines 11, the data lines (not shown) are arranged on the gate insulating film 14 such that the data lines cross the gate lines 11, a passivation film 15 is arranged on portions provided by the gate insulating film 14 including the data lines and pixel electrodes (not shown) are arranged in portions provided by the passivation film 15 corresponding to the pixel region.

A black matrix layer 21 is arranged on the second substrate 20 in portions corresponding to the gate lines, the data lines and the thin film transistors, color filter layers 22 are arranged on the second substrate 20 including the black matrix layer 21, and an overcoat layer 23 is arranged over the entire surface of the black matrix layer 21 and the color filter layers 22.

A first alignment film 16 is arranged over the passivation film 15 including the resulting structure on the first substrate 10 and a second alignment film 24 is arranged over the overcoat layer 23 on the second substrate 20.

In addition, a first column spacer 30 and a second column spacer 40 are arranged in different predetermined portions on the gate lines 11, wherein the first column spacer 30 has a first height corresponding to the gap between the first and second substrates 10 and 20 and the second column spacer 40 has a second height ΔH smaller than the first height.

The first column spacer 30 functions to maintain the cell gap between the first and second substrates 10 and 20, and the second column spacer 40, together with the first column spacer 30, resists an applied predetermined external pressure, thereby preventing deformation resulting from concentration of the pressure in any one of the spacers.

The aforementioned conventional liquid crystal display device has the following disadvantages:

First, when column spacers are employed, they have a large area in contact with the opposing substrate. For this reason, when a frictional force is applied by touch operations, the column spacers take a long time to return to their original state after the column spacers are pushed in one direction. Before returning an original state, display defects occur.

Second, when ball spacers are used instead of the column spacers in order to solve the disadvantages such as touch-defects, they tend to roll into pixel regions due to their mobility, causing other defects e.g. display defects.

SUMMARY OF THE INVENTION

Accordingly, the present invention is directed to a liquid crystal display (LCD) device and a method for manufacturing the same that substantially obviate one or more problems due to limitations and disadvantages of the related art.

An object of the present invention is to provide a liquid crystal display (LCD) device and a method for manufacturing the same, capable of maintaining a cell gap and preventing press defects caused by application of a predetermined external pressure via the use of ball spacers.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device comprises: a first substrate and a second substrate facing each other, wherein a plurality of subpixels, each including a pixel region and a non-pixel region adjacent to the pixel region, are defined in the form of a matrix on the first substrate and the second substrate; a plurality of gate lines and a plurality of data lines formed in respective non-pixel regions on the first substrate such that the gate lines and the data lines intersect each other, to define the pixel regions; a plurality of thin film transistors each formed at an intersection between an associated one of the gate lines and an associated one of the data lines; a black matrix layer formed on the second substrate in portions corresponding to the non-pixel regions; a plurality of first spacers formed in predetermined portions on the black matrix layer between the first and second substrates, the first spacers comprising a plurality of first balls with a first diameter and a first solid to aggregate the first balls; a plurality of second spacers formed in predetermined portions on the black matrix layer between the first and second substrates, the second spacers comprising a plurality of second balls with a second diameter 0.2 to 0.6 μm smaller than the first diameter and a second solid to aggregate the second balls; and a liquid crystal layer filled between the first substrate and the second substrate.

In other aspect, a method for manufacturing a liquid crystal display device comprising: preparing a first substrate and a second substrate, wherein a plurality of sub-pixels, each including a pixel region and a non-pixel region adjacent to the pixel region, are defined in the form of a matrix on the first substrate and the second substrate; forming a plurality of gate lines and a plurality of data lines in respective non-pixel regions on the first substrate such that the gate lines and the data lines intersect each other, to define pixel regions; forming a plurality of thin film transistors at each intersection between an associated one of the gate lines and an associated one of the data lines; forming a black matrix layer on the second substrate in portions corresponding to the non-pixel regions; ink-jetting a first spacer material in predetermined portions on the black matrix layer between the first and second substrates to form a plurality of first spacers, wherein the first spacer material comprises a plurality of first balls with a first diameter, a liquid thermosetting binder and a solvent; ink-jetting a second spacer material in predetermined portions on the black matrix layer between the first and second substrates to form a plurality of second spacers, wherein the second spacer material comprises a plurality of second balls with a second diameter 0.2 to 0.6 μm smaller than the first diameter, a liquid thermosetting binder and a solvent; and forming a liquid crystal layer between the first substrate and the second substrate, and assembling the first substrate to the second substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention associated with an LCD device and a method for manufacturing the same according to the present invention, examples of which are illustrated in the annexed drawings. Wherever possible, the same reference numbers will be used throughout the drawings to refer to the same or like parts.

Hereinafter, an LCD device and a method for manufacturing the same according to the present invention will be described with reference to the annexed drawings.

Figure 1:
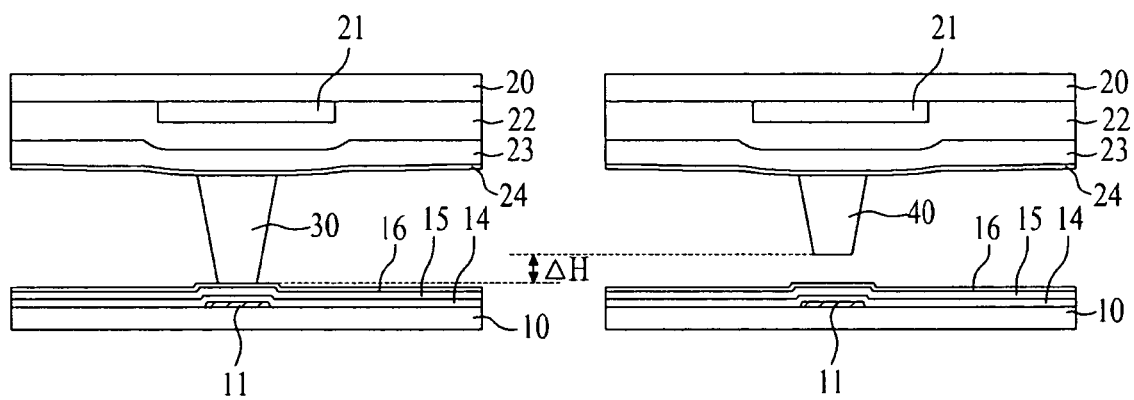
FIG. 1 is a sectional view illustrating a conventional liquid crystal display device.
Figure 2:
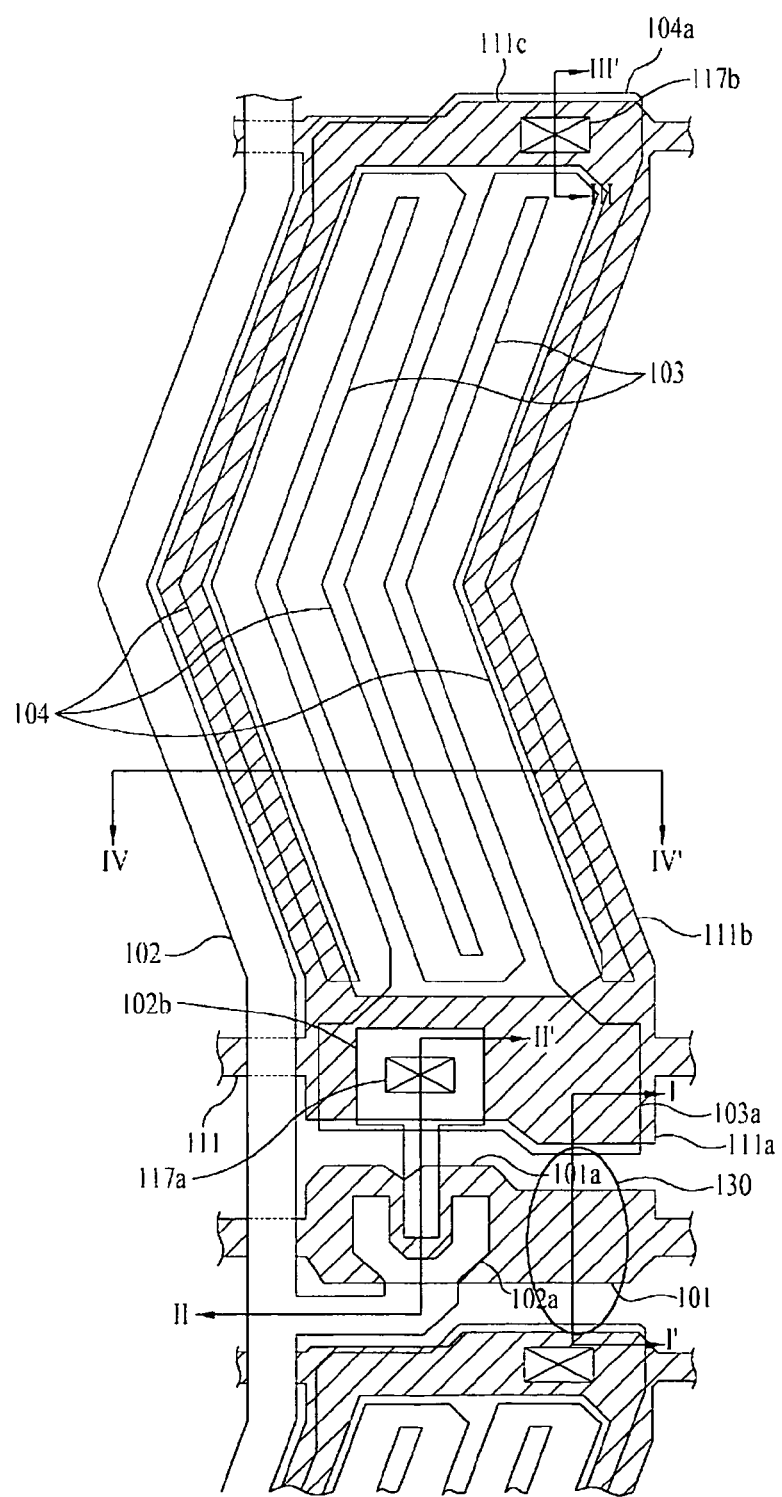
FIG. 2 is a plan view illustrating a liquid crystal display device according to the present invention.
Figure 3:
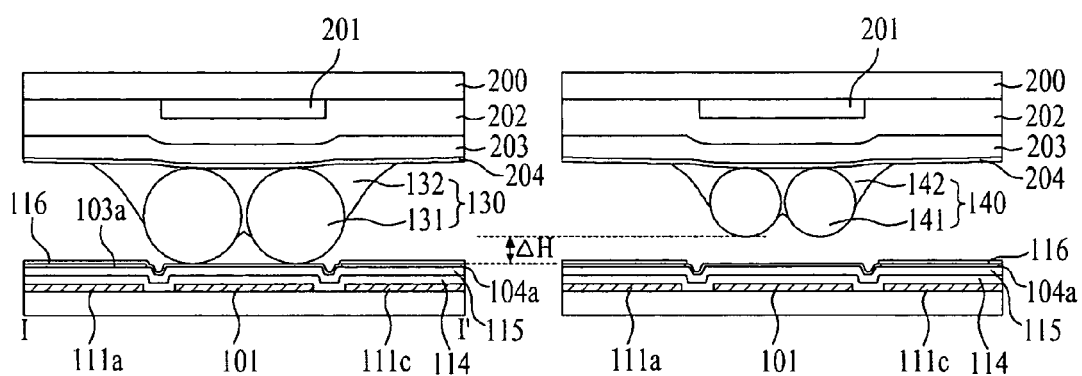
FIG. 3 is a cross-sectional view illustrating a liquid crystal display device comprising first and second spacers arranged along the line I-I' of FIG. 2.
Figure 4:
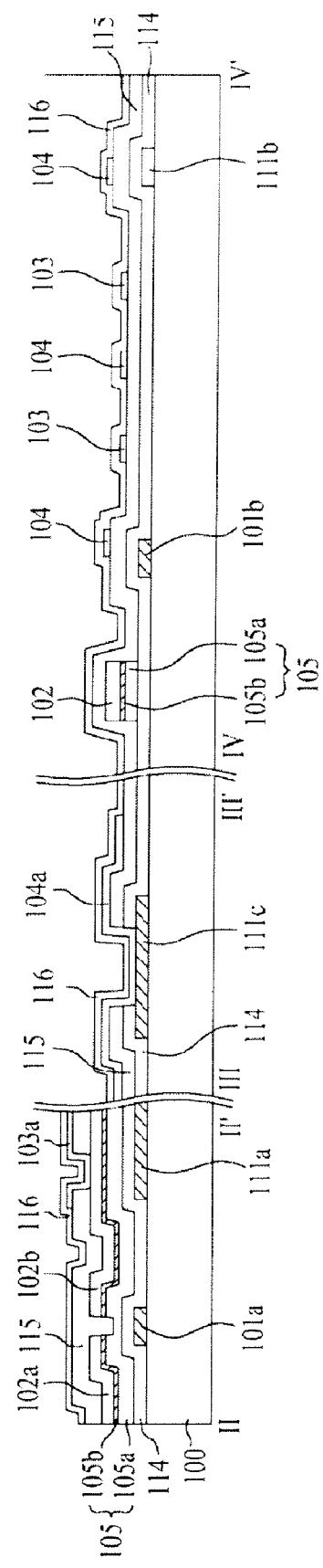
FIG. 4 is a cross-sectional view taken along the lines II-II', III-III' and IV-IV' of FIG. 2.

FIG. 2 is a plan view illustrating a liquid crystal display device according to the present invention. FIG. 3 is a cross-sectional view illustrating a liquid crystal display device comprising first and second spacers arranged along the line I-I' of FIG. 2. FIG. 4 is a cross-sectional view taken along the lines II-II', III-III' and IV-IV' of FIG. 2.

As shown in FIGS. 2 to 4, the liquid crystal display device according to the present invention comprises: a first substrate 100 and a second substrate 200 facing each other; a plurality of gate lines 101 and a plurality of data lines 102 arranged on the first substrate 100 such that the gate lines 101 and the data lines 102 intersect each other to define pixel regions; thin film transistors (TFTS) located at each intersection of an associated data line and gate line, and pixel electrodes 103 and common electrodes 104 alternately arranged in the respective pixel regions; and a liquid crystal layer (not shown) sealed between the first substrate 100 and the second substrate 200.

With reference to FIGS. 2 and 3, the structure of the second substrate 200 will be illustrated in more detail.

The second substrate 200 comprises a black matrix layer 201 for blocking incidence of light to regions other than the pixel regions, i.e., in portions corresponding to the gate lines, the data lines and the thin film transistors; R, G and B color filter layers 202 to render colors in the corresponding pixel regions; and an overcoat layer 203 arranged over the entire surface of the black matrix layer 201 and the color filter layers 202.

The second substrate 200 further comprises a second alignment film 204 arranged on the overcoat layer 203, and a first spacer 130 and a second spacer 140 arranged in different regions provided by the black matrix layer 201 on the second alignment film 204.

As shown in FIG. 3, the first spacer 130 comprises a plurality of first balls 131 having a diameter which corresponds to the gap between the first and second substrates 100 and 200, and a first solid 132 to allow the first balls 131 to be adhered in the form of aggregates onto the surface of the second alignment film 204.

In addition, the second spacer 140 comprises a plurality of second balls 141 having a diameter smaller than that of the first balls 131 constituting the first spacer 130 and a second solid 142 to allow the second balls 141 to be adhered in the form of aggregates onto the surface of the second alignment film 204.

In this case, the first and second spacers 130 and 140 comprise the first and second balls 131 and 141 that differ from each other in size but are formed of the same material. That is, each of the materials for the first and second spacers 130 and 140 comprises a plurality of balls having the predetermined size, a liquid thermosetting binder which is in a liquid state prior being cured into a solid, and a solvent. In order to vary the number of balls contained in the first and second spacers 130 and 140, and in order to vary the adherence level of the first and second spacers 130 and 140, the amount of the thermosetting liquid binder may be increased or decreased.

In addition, the first and second spacers 130 and 140 are arranged on the black matrix layer 261 in the structure provided on the second substrate 200, and at the same time, the first and second 130 and 140 are opposing to the gate lines 101, the common lines 111 and other lines arranged in the same layer as these lines in the structure provided on the first substrate 100.

The difference in height between the first and second spacers 130 and 140, represented by "ΔH", is about 0.1 to 1 μm. In this case, the height of the first spacer 130 is about 2.0 to 5.0 μm, the height of the second spacer 140 is ΔH smaller than that of the first spacer 130, and the heights of the first and second spacers 130 and 140 are determined by the first and second balls constituting the first and second spacers, respectively.

It is preferable that ΔH, the difference in height between the first and second spacers 130 and 140, be about 0.2 to 0.6 μm, taking into consideration efficient improvement in both touch defects and gravity defects. As can be seen from the graphs showing experimental results which will be illustrated below, when ΔH is approximately 0.2 to 0.6 µm, a wider liquid crystal margin range can be secured.

Furthermore, the first spacer 130 functions to maintain the cell gap between the first and second substrates 100 and 200, and the second spacer 140 together with the first spacer 130 resist a predetermined external pressure applied to the surfaces of the first and second substrates 100 and 200, thereby preventing variation in the shape of any one spacer. For the purpose of realizing these functions, the arrangement ratio of the second spacer 140 is designed to be larger than that of the first spacer 130. For example, the number of the first spacers 130 arranged in every 20 subpixels is 3.4, and the number of the second spacers 140 arranged in every 20 subpixels is 13.3. The gap between two adjacent second spacers 140 is designed to be smaller than the gap between two adjacent first spacers 130. In some cases, the arrangement ratios of the first and second spacers 130 and 140 can be increased or decreased. The arrangement ratios of the spacers are determined within the range of 1 to 100 spacers per about 100 subpixels. At this time, preferably, the first and second spacers 130 and 140 are arranged on the second substrate 200 such that the ratio of the second spacers 140 to the first spacers 130 is 10 to 20.

The first spacer 130 includes a plurality of first balls 131 and the second spacer 140 includes a plurality of second balls 141. In the process of ink-jetting to form the first and second spacers 130 and 140, respective balls are not jetted separately in corresponding regions, but respective drops comprising the plurality of balls are jetted therein. Consequently, since the liquid spacer material exhibits spreadability, prior to being jetted and then cured, the first and second spacers 130 and 140 have an oval-like horizontal section. Accordingly, the horizontal sections of the first and second spacers 130 and 140 which comprise the first and second balls 131 and 141, respectively, are not limited to circles.

Here, the first and second spacers 130 and 140 are formed in accordance with an ink-jetting method, which is conducted by jetting spacer materials from separate heads in predetermined positions on the second alignment film 204. Upon each jetting, the plurality of balls 131 or 141 are jetted in a predetermined region from each of the heads, and then remain aggregated therein. The spacer material contained in each head comprises a liquid thermosetting binder (i.e., the liquid state of the solid 132 or 142), a solvent (not shown), and a plurality of balls 131 or 141, wherein providing the total weight of the liquid thermosetting binder and the solvent is equal to 100 wt %, the weight of the liquid thermosetting binder is 1 wt % to 20 wt %, and the weight of the solvent is 80 wt % to 99 wt %. And, the weight of the balls is 0.1 wt % to 3 wt % with respect to the total weight of the thermosetting binder and the solvent.

As a first exemplary example, providing the total weight of the liquid thermosetting binder and the solvent is equal to 100 wt %, the liquid thermosetting binder is 1 wt %, and the solvent is 99 wt %, and additional, the balls is 0.1 wt %. As a second exemplary example, providing the total weight of the liquid thermosetting binder and the solvent is equal to 100 wt % and the solvent is 20 wt %, and additional, the balls is 3 wt %. As a third exemplary example, providing the total weight of the liquid thermosetting binder and the solvent is equal to 100 wt %, the liquid thermosetting binder is 10 wt %, and the solvent is 90 wt %, and additional, the balls is 2 wt %.

In the process of ink-jetting, such a spacer material including the plurality of balls is jetted in the corresponding region and then cured at about 80 to 300° C. As a result, the liquid thermosetting binder is cured and then solidified in the form of aggregates including the plurality of first and second balls 131 and 141, while the solvent is vaporized.

The solids 132 and 142 are in the liquid forms of thermosetting binder before it is subjected to curing. For example, the solids include at least one of organic acrylic, urethane and epoxy compounds, or a silicone compound. Specific examples of acrylic compounds may include ethyl methacrylate, N-butyl methacrylate, isobutyl methacrylate, dicyclopentanyl methacrylate, benzyl methacrylate, glycidyl methacrylate, 2-hydroxyethyl methacrylate, methacrylic acid isobornyl methacrylate, styrene monomers and polymers thereof. In addition, the acrylic compounds may be used alone or in combinations thereof.

Solvents that can be used for the spacer material must have a boiling point of 60 to 300° C. For example, glycol ether may be used as the solvent. Examples of glycol ethers which may be used include propylene glycol methyl ether (PGME), dipropylene glycol methyl ether (DGME), tripropylene glycol methyl ether (TGME), propylene glycol methyl ether acetate (PGMEA), dipropylene glycol methyl ether acetate (DGMEA), propylene glycol n-propyl ether (PGPE), dipropylene glycol n-propyl ether (DGPE), propylene glycol n-butyl ether (PGBE), dipropylene glycol n-butyl ether (DGBE), tripropylene glycol n-butyl ether (TGBE), propylene glycol phenyl ether (PGPE), propylene glycol diacetate (PGD), dipropylene glycol dimethyl ether (DGDE), diethylene glycol ethyl ether (DGEE), diethylene glycol methyl ether (DGME), diethylene glycol n-butyl ether (DGBE), diethylene glycol hexyl ether (DGHE), diethylene glycol n-butyl ether acetate (DGBEA), ethylene glycol propyl ether (EGPE), ethylene glycol n-butyl ether (EGBE), ethylene glycol hexyl ether (EGHE), ethylene glycol n-butyl ether acetate (EGBEA), triethylene glycol methyl ether (TGME), triethylene glycol ethyl ether (TGEE), triethylene glycol n-butyl ether (TGBE), ethylene glycol phenyl ether (EGPE) and ethylene glycol n-butyl ether mixtures (EGBEM).

Preferably, the solvent has a surface tension of 20 to 80 dynes/cm, a viscosity of 1 to 30 cP and a density of 0.8 to 1.2 g/cc at normal temperature, in example, at 18~25° C. Based on these properties, the solvent is vaporized and removed during curing at about 80 to 300° C.

In addition, the first and second balls 131 and 141 are made of an organic compound e.g. divinylbenzene. The first and second balls 131 and 141 can be distinguished from the solids 132 and 142 and the solvent in the respective heads, to form the first spacer 130 and the second spacer 140, in that the balls are present in the form of white powders, while the solids 132 and 142 and the solvent are in liquid states. If necessary, the first and second balls 131 and 141 may be subjected to surface-treatment prior be mixed with the other spacer materials so that they can be distinguished from other liquid components.

As mentioned above, the first and second spacers 130 and 140 may be formed on the second alignment film 204. Alternatively, in reverse, after the first and second spacers 130 and 140 are formed on the overcoat layer 203 or the common electrode, the second alignment film 204 may be formed on the overcoat layer 203 or the common electrode including the first and second spacers 130 and 140.

The first and second spacers 130 and 140 have a two-dimensional oval-like shape within the range of the width of the black matrix layer 201. That is, the number of corresponding balls 131 or 141 increases towards the center of the spacers, and on the other hand, the number of corresponding balls 131 or 141 decreases towards the edge of the spacers. The first and second solids 132 and 142 prevent the jetted first and second balls 131 and 141 from being dispersed in portions where the first and second spacers 130 and 140 are to be formed, instead being aggregated. Thus, the first and second solids 132 and 142 function to set the first and second balls 131 and 141 on the second alignment film 204 or the overcoat layer 203. The first and second spacers 130 and 140 have an oval-like shape, because they are jetted in a liquid state and thus partially spread.

Here, the first spacer 130 functions to maintain the cell gap between the first substrate 100 and the second substrate 200. Since the second spacer 140 is shorter than the first spacer 130 it comes into contact with the outmost top surface (i.e. the first alignment film 116) of the structure provided on the first substrate 100, only when a predetermined external pressure is applied. Consequently, the second spacer 140 resists the external pressure together with the first spacer 130, thereby preventing plastic deformation resulting from concentration of pressure on the first spacer 130 alone. As a result, press defects due to the plastic deformation can be avoided.

The first spacer 130 includes balls 131 having a spherical shape and has a dot-like narrow contact area in contact with the outmost top surface of the structure provided on the first substrate 100. For these reasons, upon touch operations in which the first substrate 100 or the second substrate 200 is pushed in one direction, the frictional force between the spacer and the opposite substrate can be reduced. This allows the substrate to readily return to its original state and thus prevents touch defects.

Meanwhile, the color filter layer 202 may be arranged in pixel regions together with the black matrix layer 201, as shown in FIGS. 2 to 4. In some cases, the color filter layer 202 may be selectively arranged only in pixel regions, or partially or entirely overlapped with the black matrix layer 201 in portions provided by the black matrix layer 201.

Hereinafter, the structure provided on the first substrate 100 will be illustrated with reference to FIGS. 2 to 4.

A plurality of gate lines 101 and a plurality of data lines 102 are arranged on the first substrate 100 facing the second substrate 200, such that the gate lines 101 and the data lines 102 intersect each other, to define pixel regions. In addition, common lines 111 are arranged on the first substrate 100 such that the common lines extend in parallel to the gate lines 101.

In addition, thin film transistors are located at each intersection of an associated data line and gate line. Each thin film transistor includes: a gate electrode 101a protruding from the associated gate line 101; a gate insulating film 114 formed over the entire surface of the first substrate 100 including the gate electrode 101a, the gate lines 101 and the common line 111; a "U"-shaped source electrode 102a and a drain electrode 102b arranged at both sides of the gate electrode 101a such that the drain electrode 102b is partially located in the "U"-shaped source electrode 102a, respectively; and semiconductor layers 105 (105a, 105b) arranged in regions including portions under the source electrode 102a and the drain electrode 102b and channel portions between the source electrode 102a and the drain electrode 102b. The semiconductor layers 105 include an amorphous silicon layer 105a and an impurity-doped semiconductor layer (n+ layer) 105b arranged thereon. The impurity-doped semiconductor layer 105b is formed by removing the channel portions between the source electrode 102a and the drain electrode 102b. The shape of the source electrode 102a is not limited to the "U"-shape and may be "-"- or "L"-shaped.

The data line 102 has a central bent portion at each subpixel such that the data line 102 forms a zigzag line. The common line 111 is integrally formed with a storage electrode 111a at each pixel and the storage electrode 111a is connected to a first common electrode connect electrode 111b which lies adjacent to both sides of the data line 102 and protrudes in parallel to the data line 102. As mentioned above, the data line 102 crosses the gate line 101 and has a bent portion at each pixel. Preferred embodiments of the present invention are not limited thereto and the data line may perpendicularly cross the gate line, or may be tilted at a predetermined angle with respect to the gate line. In the illustrated drawings, the reason for imparting the bent portion to the data line 102 at each pixel is because the common electrode 104 and the pixel electrode 103 extend in parallel to the data line, and a vertically symmetrical electric field is thus generated, on the basis of the bent portion, which allows for alignment of liquid crystals in different directions and thus leads to an improvement in viewing angle.

The common electrode 104 and the pixel electrode 103 constitute a transparent electrode in the same layer at each pixel region and have alternately arranged portions. The common electrode 104 is partially overlapped with the first common electrode connect electrode 111b arranged therebeneath. A second common electrode connect electrode 111c which extends in parallel to the gate line 101 includes as an electrical contact a second contact portion 117b, which passes through the passivation film 115 and the gate insulating film 114 interposed between the first substrate 100 and the second common electrode connect electrode 111c.

In addition, the pixel electrode 103 is branched from the second storage electrode 103a overlapping the first storage electrode 111a, and has as an electrical contact a first connect portion 117a which passes through the passivation film 115 interposed between the pixel electrode 103 and the drain electrode 102b.

Hereinafter, a method for manufacturing the structure of the first substrate 100 including the thin film transistors, the common electrodes, and the pixel electrodes will be illustrated in detail.

A metal such as Mo, Al or Cr is deposited on a first substrate 100 and is then patterned through photolithographic processes to simultaneously form a plurality of gate lines 101, gate electrodes 101a, common lines 111 extending parallel to the gate lines 101, first storage electrodes 111a integrally formed with the common lines 111, and the first common electrode connect electrodes 111b and the second common electrode connect electrodes 111c branched from the first storage electrodes 111a and protruded in pixel regions. At this time, the gate electrodes 101a are formed in predetermined positions provided by pixel regions such that they are protruded from the gate lines 201, and the first storage electrodes 111a, the first common electrode connect electrodes 111b and the second common electrode connect electrodes 111c are formed in the boundaries between adjacent pixel regions.

Then, an inorganic material is deposited over the first substrate 100 provided with the gate lines 101, the common lines 111, the gate electrodes 101a, the first storage electrodes 111a, and the first and second common electrode connect electrodes 111b and 111c, to form a gate insulating film 114.

Subsequently, an amorphous silicon layer 105a and an impurity-doped semiconductor layer 105b are sequentially deposited over the gate insulating film 114.

A metal such as Mo, Al or Cr is deposited on the resulting structure and a photosensitive film is applied thereto. For example, the photosensitive film may be a negative photosensitive film.

The portions where the data lines, source electrodes and drain electrodes are formed define a light-transmission part, the channel portions of the semiconductor layers define a light-semitransmission part, and the remaining portions defined a light-shield part. In this regard, masks (not shown) corresponding to the light-shield part are positioned on the photosensitive film.

Subsequently, the photosensitive film is exposed to light through the masks and is then developed, to form a first photosensitive film pattern such that the portions provided by the light-transmission part maintain its total thickness (remain unetched), the portions provided by the light-semi-transmission part are removed to a predetermined thickness and the portions provided by the light-shield part are removed to the total thickness (thoroughly removed). The metal material is patterned using the first photosensitive film pattern (not shown) in accordance with photolithographic processes. The first photosensitive film pattern includes a first pattern which has a bent portion at each pixel region, while crossing the gate line 101, and a second pattern (including light-transmission part where source and drain electrodes are formed, and the light-semitransmission part of the masks) which is connected to the first pattern at the intersection of the gate line 101 and extends toward the pixel region. After the patterning of the metal using the first photosensitive film pattern, data lines 102a having a bent portion at each pixel are formed, and a dummy pattern (not shown) connected to the data line 102 is formed in portions provided by the second pattern.

Subsequently, the impurity-doped semiconductor layer 105b and the amorphous silicon layer 105a are selectively removed using the data line 102 and the dummy pattern as masks.

Subsequently, the first photosensitive film pattern is subjected to ashing such that the photosensitive film corresponding to the light-semitransmission part of the mask which has a relatively lower thickness in the first photosensitive film pattern (not shown) is removed, to form a second photosensitive film pattern (not shown).

Subsequently, the portions of the metal 102 (located in the same layer as the data line 102) and the exposed the impurity-doped semiconductor layer 105b in the dummy pattern are selectively removed using the second photosensitive pattern as a mask, to form source electrodes 102a and drain electrodes 102b and to pattern the impurity-doped semiconductor layer 105b arranged thereunder. During this process, the impurity-doped semiconductor layer 105b interposed between the source electrode 102a and the drain electrode 102b is removed. Such a removed region is defined as a channel part. At this time, the source electrode 102a is formed in the "U" shape that protrudes from the data line 102 toward the pixel region. The drain electrode 102b is spaced apart from the source electrode 102a by a predetermined distance and is partially embedded in the "U" shape of the source electrode 102a.

Subsequently, a passivation film 115 is deposited over the gate insulating film 114 provided with the data lines 102, the source electrodes 102a and the drain electrodes 102b. At this time, the passivation film 115 is generally made of an inorganic material e.g. SiNx. In order to increase an aperture ratio of liquid crystal cells, recently introduced low dielectric organic materials such as benzocyclobutene (BCB), spin on glass (SOG) or acrylic compounds may be used.

Subsequently, the passivation film 115 is selectively etched in predetermined portions on the drain electrode 102b to form a first contact portion 117a, and the passivation film 115 and gate insulating film 114 provided in predetermined portions on the second common electrode connect electrode 111c are selectively removed to form a second contact portion 117b.

Subsequently, a transparent electrode is deposited over the passivation film 115 including the first and second contact portions 117a and 117b and is then selectively removed, to form a plurality of common electrodes 104 partially overlapped with the common electrode connect electrodes 111b at respective pixels and spaced apart from one another, third common electrode connect electrodes 104a overlapping the second common electrode connect electrodes 111c arranged on the common electrodes 104, while connecting the common electrodes 104 to the second common electrode connect electrodes 111c, and a plurality of the pixel electrodes 103 alternating with the common electrodes 104.

Subsequently, a first alignment film 116 is formed over the entire surface of the passivation film 115 including the pixel electrode 103 and the common electrodes 104.

Figure 5:
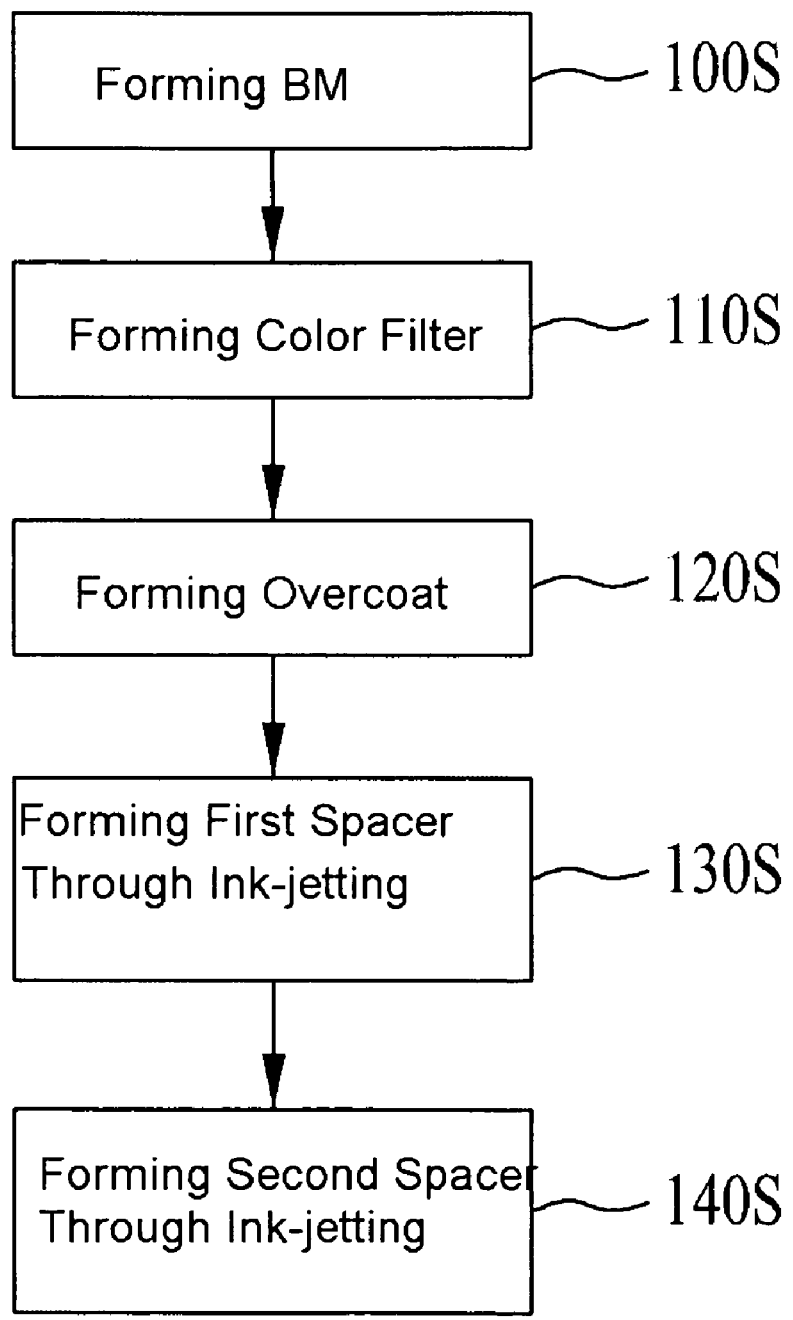
FIG. 5 is a flow chart illustrating a method for forming a second substrate of the liquid crystal display device according to the present invention.

FIG. 5 is a flow chart illustrating a method for forming the second substrate of the liquid crystal display device according to the present invention.

With reference to FIGS. 3 and 5, a method for forming the second substrate of the liquid crystal display device according to the present invention will be illustrated in detail.

First, a black matrix layer 201 is formed on the second substrate 200 in a region other than the pixel regions (100S). The black matrix layer 201 is designed to block transmission of light into portions corresponding to gate lines, data lines and thin film transistors provided in the region other than the pixel regions.

Subsequently, R, G, B color filter layers 202 for rendering colors are formed at respective pixels (110S).

Subsequently, an overcoat layer 203 is formed over the black matrix layer 201 and the color filter layers 202. (120S).

Subsequently, a second alignment film 204 is formed on the overcoat layer 203.

Subsequently, a predetermined spacer material is jetted from a first head (not shown) on the second alignment film 204 in predetermined portions provided by the black matrix layer 201 and then cured, to form first spacers 130 (130S). At this time, the first head is filled with the spacer material which comprises a thermosetting binder in the liquid stage prior to curing of a first solid 132, a solvent and a plurality of first balls 131 having a first diameter in an amount not more than 3 wt %, based on the total weight of the liquid thermosetting binder and the solvent. The solvent is vaporized and then removed in the process of curing the first spacers 130.

Subsequently, a predetermined spacer material is jetted from a second head (not shown) on the second alignment film 204 in predetermined portions where there is no first spacer 130 provided by the black matrix layer 201 and then cured, to form second spacers 140 (140S). At this time, the second head is filled with the spacer material which comprises a thermosetting binder in the liquid stage prior to curing of a second solid 142, a solvent and a plurality of second balls 141 having a second diameter in an amount not more than 3 wt %, based on the total weight of the liquid thermosetting binder and the solvent. The solvent is vaporized and then removed in the progress of curing the second spacers 140.

The first and second balls 131 and 141 contained in the first and second heads, respectively, differ in size from each other. By setting the content of the liquid thermosetting binder in the state prior to curing of the first solid, which is to be mixed with the first balls 131, contained in the first head, functioning as the cell gap due to their relatively large diameter, greater than the content of the liquid thermosetting binder contained in the second head in the state prior to curing of the second solid, the aggregation force of the first balls having the higher diameter is greater than the aggregation force of the second balls. The spacer materials contained in the respective heads comprise 20 wt % or less of a liquid thermosetting binder in the liquid state of the first solid 132, and 20 wt % or less of a liquid thermosetting binder in the liquid state of the second solid 142. The liquid thermosetting binder of the first solid 132 is mixed in a higher amount within the defined range, with the first balls 131 having a relatively larger diameter.

The number of the first spacers 130 functioning to maintain the cell gap, arranged per 100 subpixels, is in the range of 1 to 50. The number of the second spacers 130 functioning to prevent press defects, arranged per 100 subpixels, is in the range of 1 to 100. The second spacers 140 function when external pressure is applied thereto. By increasing the number of second spacers 140, the second spacers exhibit excellent pressure resistance. Accordingly, the density of the second spacers 140 is designed to be higher than that of the first spatters 130.

In addition, the first balls 131 and the second balls 141 contained in the first spacers 130 and second spacer 140, respectively, are formed to have a density of 1 to several tens in $mm^2$ of total area of the second substrate 200.

As shown in FIG. 3, the first spacer 130 comprises a plurality of first balls 131 having a diameter which corresponds to the gap between the first and second substrates 100 and 200, and a first solid 132 to allow the first balls 131 to be adhered in the form of aggregates onto the surface of the second alignment film 204.

In addition, the second spacer 140 comprises a plurality of second balls 141 having a diameter smaller than that of the first balls 131 constituting the first spacer 130 and a second solid 142 to allow the second balls 141 to be adhered in the form of aggregates onto the surface of the second alignment film 204.

In this case, the first and second spacers 130 and 140 comprise the first and second balls 131 and 141 that differ from each other in size but are formed of the same material. That is, each of the materials for the first and second spacers 130 and 140 comprises a plurality of balls having the predetermined size, a liquid thermosetting binder which is in a liquid state prior being cured into a solid, and a solvent. In order to vary the number of balls contained in the first and second spacers 130 and 140 and adherence level thereof, the amount of the liquid thermosetting binder may be increased or decreased.

In addition, the first and second spacers 130 and 140 are arranged on the black matrix layer 201 in the structure provided on the second substrate 200, and at the same time, on the gate lines 101, the common lines 111 and other lines arranged in the same layer as these lines in the structure provided on the first substrate 100.

The difference in height between the first and second spacers 130 and 140, represented by "ΔH", is about 0.1 to 1 μm. In this case, the height of the first spacer 130 is about 2.0 to 5.0 μm, the height of the second spacer 140 is ΔH smaller than that of the first spacer 130, and the heights of the first and second spacers 130 and 140 are determined by the first and second balls constituting the first and second spacers, respectively.

It is preferable that ΔH, the difference in height between the first and second spacers 130 and 140, be about 0.2 to 0.6 μm, taking into consideration efficient improvement in both touch defects and gravity defects. As can be seen from the graphs showing experimental results which will be illustrated below, when ΔH is approximately 0.2 to 0.6 μm, a wider liquid crystal margin range can be secured.

Furthermore, the first spacer 130 functions to maintain the cell gap between the first and second substrates 100 and 200, and the second spacer; 140 together with the first spacer 130 resist a predetermined external pressure applied to the surfaces of the first and second substrates 100 and 200, thereby preventing variation in the shape of any one spacer. For the purpose of realizing these functions, the arrangement ratio of the second spacer 140 is designed to be larger than that of the first spacer 130. For example, the number of the first spacers 130 arranged in every 20 subpixels is 3.4, and the number of the second spacers 140 arranged in every 20 subpixels is 13.3. The gap between two adjacent second spacers 140 is designed to be smaller than the gap between two adjacent first spacers 130. In some cases, the arrangement ratios of the first and second spacers 130 and 140 can be increased or decreased. The arrangement ratios of the spacers are determined within the range of 1 to 100 spacers per about 100 subpixels.

The first and second spacers 130 and 140 include a plurality of first balls 131 and a plurality of second balls 141, respectively. In the process of ink-jetting to form the first and second spacers 130 and 140, respective balls are not jetted separately in corresponding regions, but respective drops comprising the plurality of balls are jetted therein. Consequently, since the liquid spacer material exhibits spreadability, prior to being jetted and then cured, the first and second spacers 130 and 140 have an oval-like horizontal cross-section. Accordingly, the horizontal cross-sections of the first and second spacers 130 and 140 which comprise the first and second balls 131 and 141, respectively, are not limited to circles.

Here, the first and second spacers 130 and 140 are formed in accordance with an ink-jetting method, which is conducted by jetting spacer materials from separate heads in predetermined positions on the second alignment film 204. Upon each jetting, the plurality of balls 131 or 141 are jetted in a predetermined region from each of the heads, and then remain aggregated therein. The spacer material contained in each head comprises 1 wt % to 20 wt % of a liquid thermosetting binder, the liquid state of the solid 132 or 142, the remaining weight of a solvent (not shown), and 0.1 to 3 wt % of a plurality of balls 131 or 141, with respect to the total weight of the thermosetting binder and the solvent.

In the process of ink-jetting, such a spacer material including the plurality of balls is jetted in the corresponding region and then cured at about 80 to 300° C. As a result, the liquid thermosetting binder is cured and then solidified in the form of aggregates including the plurality of first and second balls 131 and 141, while the solvent is vaporized. At this time, the first and second spacers are sequentially formed using heads containing first and second balls 131 and 141, respectively. Alternatively, the first and second spacers may be simultaneously formed through ink-jetting using a first ball 131—containing head and a second ball 141—containing head arranged in parallel to each other.

The solids 132 and 142 are in the liquid forms of thermosetting binder before it is subjected to curing. For example, the solids include at least one of organic acrylic, urethane and epoxy compounds, or a silicone compound. Specific examples of acrylic compounds may include ethyl methacrylate, N-butyl methacrylate, isobutyl methacrylate, dicyclopentanyl methacrylate, benzyl methacrylate, glycidyl methacrylate, 2-hydroxyethyl methacrylate, methacrylic acid isobornyl methacrylate, styrene monomers and polymers thereof. In addition, the acrylic compounds may be used alone or in combinations thereof.

Solvents that can be used for the spacer material must have a boiling point of 60 to 300° C. For example, glycol ether may be used as the solvent. Examples of glycol ethers which may be used include propylene glycol methyl ether (PGME), dipropylene glycol methyl ether (DGME), tripropylene glycol methyl ether (TGME), propylene glycol methyl ether acetate (PGMEA), dipropylene glycol methyl ether acetate (DGMEA), propylene glycol n-propyl ether (PGPE), dipropylene glycol n-propyl ether (DGPE), propylene glycol n-butyl ether (PGBE), dipropylene glycol n-butyl ether (DGBE), tripropylene glycol n-butyl ether (TGBE), propylene glycol phenyl ether (PGPE), propylene glycol diacetate (PGD), dipropylene glycol dimethyl ether (DGDE), diethylene glycol ethyl ether (DGEE), diethylene glycol methyl ether (DGME), diethylene glycol n-butyl ether (DGBE), diethylene glycol hexyl ether (DGHE), diethylene glycol n-butyl ether acetate (DGBEA), ethylene glycol propyl ether (EGPE), ethylene glycol n-butyl ether (EGBE), ethylene glycol hexyl ether (EGHE), ethylene glycol n-butyl ether acetate (EGBEA), triethylene glycol methyl ether (TGME), triethylene glycol ethyl ether (TGEE), triethylene glycol n-butyl ether (TGBE), ethylene glycol phenyl ether (EGPE) and ethylene glycol n-butyl ether mixtures (EGBEM).

Preferably, the solvent has a surface tension of 20 to 80 dynes/cm, a viscosity of 1 to 30 cP and a density of 0.8 to 1.2 g/cc at ambient temperature. Based on these properties, the solvent is vaporized and removed during curing at about 80 to 300° C.

In addition, the first and second balls 131 and 141 are made of an organic compound e.g. divinylbenzene. The first and second balls 131 and 141 can be distinguished from the solids 132 and 142 and the solvent in the respective heads, to form the first spacer 130 and the second spacer 140, in that the balls are present in the form of white powders, while the solids 132 and 142 and the solvent are in liquid states. If necessary, the first and second balls 131 and 141 may be subjected to surface-treatment prior be mixed with the other spacer materials so that they can be distinguished from other liquid components.

As mentioned above, the first and second spacers 130 and 140 may be formed on the second alignment film 204. Alternatively, in reverse, after the first and second spacers 130 and 140 are formed on the overcoat layer 203 or the common electrode, the second alignment film 204 may be formed on the overcoat layer 203 or the common electrode including the first and second spacers 130 and 140.

The first and second spacers 130 and 140 have a two-dimensional oval-like shape within the range of the width of the black matrix layer 201. That is, the number of corresponding balls 131 or 141 increases towards the center of the spacers, and on the other hand, the number of corresponding balls 131 or 141 decreases towards the edge of the spacers. The first and second solids 132 and 142 prevent the jetted first and second balls 131 and 141 from being dispersed in portions where the first and second spacers 130 and 140 are to be formed, instead being aggregated. Thus, the first and second solids 132 and 142 function to set the first and second balls 131 and 141 on the second alignment film 204 or the overcoat layer 203. The first and second spacers 130 and 140 have an oval-like shape, because they are jetted in a liquid state and thus partially spread.

Here, the first spacer 130 functions to maintain the cell gap between the first substrate 100 and the second substrate 200. Since the second spacer 140 is shorter than the first spacer 130 it comes into contact with the outmost top surface (i.e. the first alignment film 116) of the structure provided on the first substrate 100, only when a predetermined external pressure is applied. Consequently, the second spacer 140 resists the external pressure together with the first spacer 130, thereby preventing plastic deformation resulting from concentration of pressure on the first spacer 130 alone. As a result, press defects due to the plastic deformation can be avoided.

The first spacer 130 includes balls 131 having a spherical shape and has a dot-like narrow contact area in contact with the outmost top surface of the structure provided on the first substrate 100. For these reasons, upon touch operations in which the first substrate 100 or the second substrate 200 is pushed in one direction, the frictional force between the spacer and the opposite substrate can be reduced. This allows the substrate to readily return to its original state and thus prevents touch defects.

Meanwhile, the color filter layer 202 may be arranged in pixel regions together with the black matrix layer 201, as shown in FIGS. 2 to 4. In some cases, the color filter layer 202 may be selectively arranged only in pixel regions, or partially or entirely overlapped with the black matrix layer 201 in portions provided by the black matrix layer 201.

Figure 6:
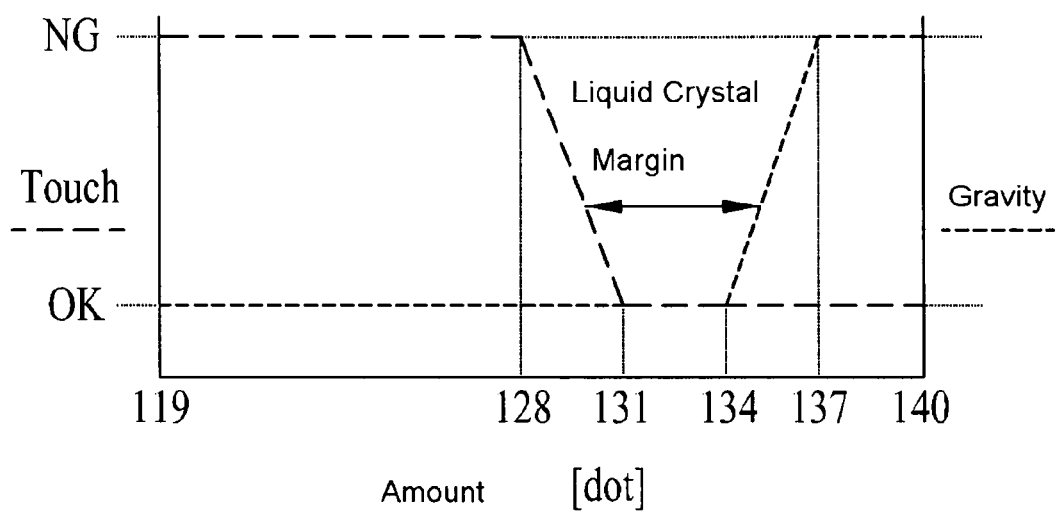
FIG. 6 is a graph showing correlation between touch defects, gravity defects and liquid crystal margin of the LCD device to which spacers comprising balls having the same size are applied.
Figure 7:
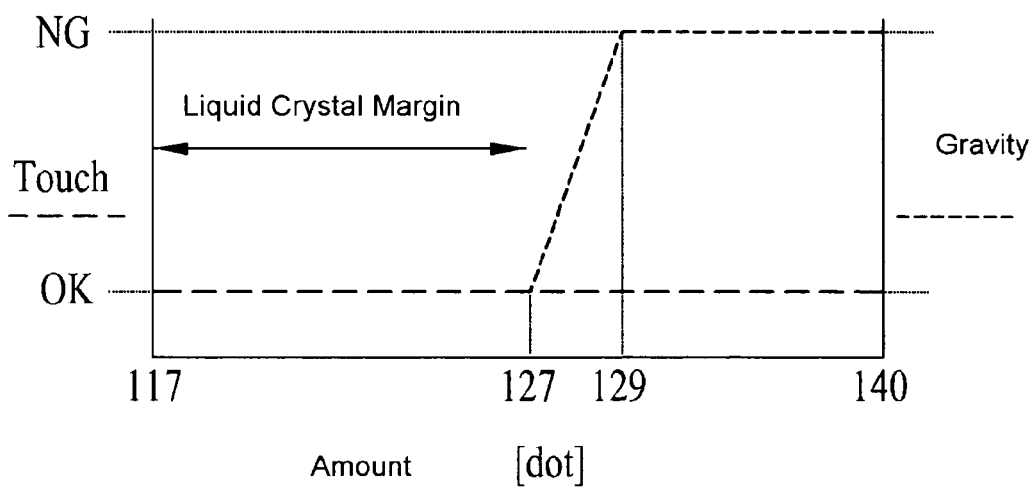
FIG. 7 is a graph showing correlation between touch defects, gravity defects and liquid crystal margin of the LCD device to which spacers comprising balls having different sizes are applied.

FIG. 6 is a graph showing correlation between touch defects, gravity defects and liquid crystal margin of the LCD device to which spacers comprising balls having the same size are applied. FIG. 7 is a graph showing correlation between touch defects, gravity defects and liquid crystal margin of the LCD device to which spacers comprising balls having different sizes are applied.

More specifically, FIG. 6 shows a graph showing a defect level in the case where balls with a uniform size of 3.0 µm are used to from spacers. As can be seen from the graph of FIG. 6, both touch defects and gravity defects are near zero and display defects are nonexistent, provided that the amount of liquid crystals is in the range of about 131 to 134 dots, i.e. either 131, 132, 133, or 134 dots. In addition, as can be confirmed, when the amount of liquid crystals is less than 131 dots, touch defects is excessively increased, and when the amount of liquid crystals exceeds 134 dots, gravity defects are increased. In these cases, spacers having balls with a uniform size of 3.0 µm are arranged at a density of one per subpixel. The margin of liquid crystals herein calculated corresponds to 3.02%

$$\left(\frac{4}{(131+134)/2}\right)$$

On the other hand, the graph shown in FIG. 7 is the case of the liquid crystal display device according to the present invention where the diameters of the first balls 131 and the second balls 141 contained in the first spacers 130 and second spacers 140, respectively, are 2.75 µm and 2.5 µm, and the first spacers 130 are arranged in a ratio of one per 20 subpixels and the second spacers are arranged in a ratio of 16 per 20 subpixels. In this case, touch defects and gravity defects are zero in the range of about 117 to 127 dots of liquid crystals, i.e., within an 11 liquid crystal dot range. This range of about 117 to 127 dots is defined as the margin of liquid crystals. That is, when the amount of liquid crystals is less than about 117 dots, touch defects are increased, and when the amount of liquid crystals exceeds 127 dots, gravity defects are increased. The margin of liquid crystals herein calculated corresponds to 9.02%

$$\left(\frac{11}{(117+127)/2}\right).$$

FIGS. 6 and 7 show the results of experiments of the case where 1 dot is 4.0 mg and a test model is 23". As can be seen from the results shown in FIGS. 6 and 7, the margin of liquid crystals is increased by about 6%, when spacers with the different size are applied, as compared to when spacers with same sizes are applied.

In the experiments of FIGS. 6 and 7, the thermosetting binder in the liquid state of the first solid 132 and the thermosetting binder in the liquid state of the second solid 142 are used in amounts of 8 wt % and 4 wt %, respectively. In this case, the contents of the thermosetting binders in the liquid state of the first and second solids 132 and 142 are controlled according to the sizes of first and second balls 131 and 141 mixed therewith, respectively, and are increased as diameters of the balls increase.

Meanwhile, as to the first and second spacers 130 and 140, the first solid 132 and the second solid 142 contained together with the first balls 131 and the second balls 141, respectively, function to prevent balls constituting the respective spacers from being protruded, due to their excessively large diameters, and set a plurality of balls in the form of aggregates. More specifically, the solids 132 and 142 prevent the movement of balls, smooth the surface of spacers 130 and 140, and prevent damage to the spacers 130 and 140 or the first alignment film 116. Accordingly, when ball spacers are provided, bright defects can be prevented, which is caused by damage to the alignment films or spacers.

An example where the liquid crystal display device according to the present invention employing an in-plane switching (IPS) mode was illustrated with reference to FIGS. 2 to 5. In the cases where the aforementioned first and second spacers are applied to TN-mode liquid crystal display devices in which pixel electrodes are formed at respective pixels and common electrodes are further formed on the second substrate, it is possible to obtain the same effects as in the example.

As apparent from the foregoing, the liquid crystal display device according to the present invention and the method for manufacturing the same have the following advantages:

First, spacers provided with balls are formed on a substrate, thereby decreasing a contact area between the balls and the opposing substrate. Accordingly, upon touch operation in which the substrate where balls are formed is pushed in one direction with respect to the opposite substrate, the frictional force between the spacers and the opposite substrate can be reduced. This allows the substrate to rapidly return to its original state and thus allows for prevention of touch defects. As a result, it is possible to prevent touch defects that may be occurred before returning after touched.

Second, the first and second spacers comprising balls that differ from each other in diameter are used. More specifically, the first spacer having a larger diameter function to maintain a cell gap, and the second spacer having a smaller diameter come in contact with the opposing substrate only when a predetermined external pressure is applied thereto. Consequently, the second spacers resists the external pressure together with the first spacers, thereby preventing occurrence of press defects in which plastic deformation results from concentration of pressure on one spacer.

Third, through formation of first and second spacers with different heights, it is possible to increase the margin of liquid crystals, while avoiding both touch defects and gravity defects, as compared to the case where spacers with the same size, functioning to maintain the cell gap, are used. That is, when the amount of liquid crystals is less than a predetermined level which is necessary for the gap between the first and second substrates, touch defects occur. When the amount of liquid crystals exceeds the predetermined level, gravity defects occur. The margin of liquid crystals refers to the range of liquid crystal amounts in which neither touch defects nor gravity defects occur. It is possible to reduce sensitivity to touch and gravity defects by increasing the arrangement ratio of the second spacers spaced apart from the opposite substrate, as compared to the first spacers which function to maintain the gap.

Fourth, a material for spacers comprising a solid and a solvent in addition to a plurality of balls is prepared in order to reduce mobility of the balls. The spacer material is jetted to a desired region through an ink-jet head and is then cured to form spacers. Accordingly, spacers have no ball protrusions and have smooth surfaces, which prevents friction between the balls and the opposite surface and damage thereby. Furthermore, the inclusion of the solid enables formation of spacers provided with balls that can be fixed, although they have a narrow area in contact with the opposite substrate.

Fifth, different sizes of ball spacers are applied to develop ink-jet spacer processes, thereby improving the margin of liquid crystals. Furthermore, the density of spacers for press prevention is controlled, to reduce press intensity. At the same time, solid content is controlled, preventing the spacers for press prevention from being protruded and thereby lowering bright defects.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
a first substrate and a second substrate facing each other, wherein a plurality of subpixels, each including a pixel region and a non-pixel region adjacent to the pixel region, are defined in the form of a matrix on the first substrate and the second substrate;
a plurality of gate lines and a plurality of data lines formed in respective non-pixel regions on the first substrate such that the gate lines and the data lines intersect each other, to define the pixel regions;
a plurality of thin film transistors each formed at an intersection between an associated one of the gate lines and an associated one of the data lines;
a black matrix layer formed on the second substrate in portions corresponding to the non-pixel regions;
a plurality of first spacers formed on the black matrix layer between the first and second substrates, the first spacers comprising a plurality of first balls with a first diameter and a first solid to aggregate the first balls, wherein the first diameter of the first ball is 2.0 to 5.0 μm;
a plurality of second spacers formed on the black matrix layer between the first and second substrates, the second spacers comprising a plurality of second balls with a second diameter smaller than the first diameter and a second solid to aggregate the second balls, wherein the difference between the first diameter and the second diameter is 0.2 to 0.6 μm; and
a liquid crystal layer filled between the first substrate and the second substrate,
wherein the first spacers and the second spacers are arranged on the different regions of the black matrix layer,
wherein, the first spacers are formed by ink-jetting a first spacer material onto the predetermined portions on the black matrix layer, followed by curing, and the second spacers are formed by ink-jetting a second spacer material onto the predetermined portions on the black matrix layer, followed by curing;
wherein the first spacer material comprise a liquid thermosetting binder, a solvent, a first balls;
when the total weight of the liquid thermosetting binder and the solvent is equal to 100 wt %, wherein the weight of the liquid thermosetting binder is 1 wt % to 20 wt %, and the weight of the solvent is 80 wt % to 99 wt %; and, the weight of the first balls is 0.1 wt % to 3 wt % with respect to the total weight of the liquid thermosetting binder and the solvent; and when the second spacer material comprise a liquid thermosetting binder, a solvent, a second ball, if the total weight of the liquid thermosetting binder and the solvent is equal to 100 wt %, wherein the weight of the liquid thermosetting binder is 1 wt % to 20 wt %, and the weight of the solvent is 80 wt % to 99 wt %; and, the weight of the second balls is 0.1 wt % to 3 wt % with respect to the total weight of the liquid thermosetting binder and the solvent; and wherein the first balls and the second balls includes at least of divinylbenzene polymer.

2. The liquid crystal display device according to claim 1, wherein the ratio of the first spacers arranged at each subpixel is from 1/100 to 1/2, and the ratio of the second spacers arranged at each subpixel is from 1/100 to 1/1.

3. The liquid crystal display device according to claim 2, wherein the first and second spacers are arranged on the second substrate such that the ratio of the second spacers to the first spacers is from 10 to 20.

4. The liquid crystal display device according to claim 1, wherein the content (wt %) of the liquid thermosetting binder contained in the first spacer material is higher than that of the liquid thermosetting binder contained in the second spacer material.

5. The liquid crystal display device according to claim 1, wherein the first and second solids include at least one of organic acrylic, urethane and epoxy compounds.

6. The liquid crystal display device according to claim 1, wherein the first and second solids include a silicone compound.

7. The liquid crystal display device according to claim 1, further comprising a color filter layer formed on the second substrate including the black matrix layer.

8. The liquid crystal display device according to claim 7, further comprising an overcoat layer formed over the entire surface of the second substrate including the black matrix layer and the color filter layer.

9. The liquid crystal display device according to claim 7, further comprising a common electrode formed over the entire surface of the second substrate including the black matrix layer and the color filter layer.

10. The liquid crystal display device according to claim 8 or 9, further comprising a first alignment film formed on the first substrate including the gate lines and the data lines, and a second alignment film formed on the overcoat layer or the common electrode arranged on the second substrate.

* * * * *